United States Patent
Ammann

(10) Patent No.: US 7,307,234 B2
(45) Date of Patent: Dec. 11, 2007

(54) PROTECTIVE GAS SUPPLY DEVICE FOR ELECTRIC ARC JOINING

(75) Inventor: Thomas Ammann, Munich (DE)

(73) Assignee: Linde Aktiengesellschaft, Wiesbaden (DE)

( * ) Notice: Subject to any disclaimer, the term of this patent is extended or adjusted under 35 U.S.C. 154(b) by 296 days.

(21) Appl. No.: 11/116,390

(22) Filed: Apr. 28, 2005

(65) Prior Publication Data

US 2005/0263494 A1     Dec. 1, 2005

(30) Foreign Application Priority Data

Apr. 29, 2004   (DE) .................. 10 2004 021 066

(51) Int. Cl.
*B23K 9/00* (2006.01)
(52) U.S. Cl. ........................ 219/74; 252/372
(58) Field of Classification Search ................ 252/372; 219/74
See application file for complete search history.

(56) References Cited

U.S. PATENT DOCUMENTS 7,211,765 B2 *   5/2007   Trube et al. ............ 219/137 R 2003/0234385 A1*  12/2003   Miklos et al. ............... 252/372

FOREIGN PATENT DOCUMENTS

FR        2646496       11/1990
WO     WO 91/13720     *  9/1991

OTHER PUBLICATIONS

European Search Report dated Sep. 12, 2005.

* cited by examiner

*Primary Examiner*—Wayne Langel
(74) *Attorney, Agent, or Firm*—Crowell & Moring LLP

(57) ABSTRACT

A protective gas supply device for on-site supply of workplaces is provided, in which a liquid argon reservoir, a liquid oxygen reservoir or a liquid carbon dioxide reservoir, and a helium supply are connected to first and second mixers supplying gas to site workplaces. The liquid argon reservoir and the liquid oxygen or carbon dioxide reservoir are connected to the feed side of the first mixer via lines, and the discharge side of the first mixer is connected to at least one workplace and to the feed side of a second mixer. The feed side of the second mixer also receives helium from the helium supply, and the discharge side of the second mixer is connected to at least one additional workplace. The invention permits economical mixing and supply of variable protective gas mixtures to work stations in an on-site environment.

8 Claims, 1 Drawing Sheet

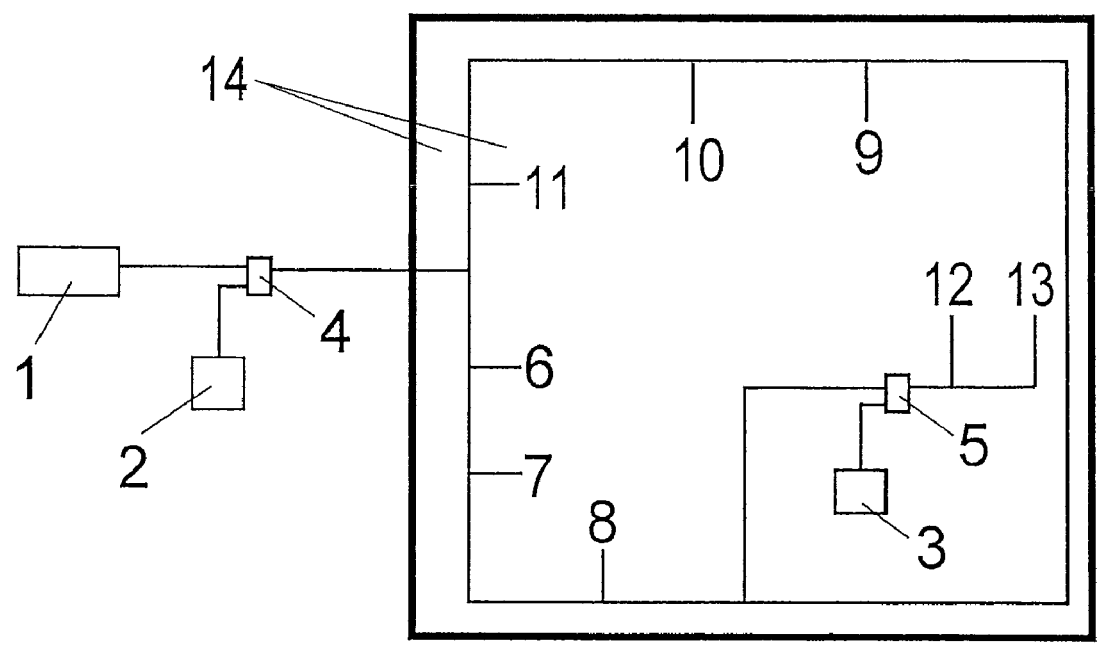

PROTECTIVE GAS SUPPLY DEVICE FOR ELECTRIC ARC JOINING

This application claims the priority of German Application No. 10 2004 021 066.7, filed Apr. 29, 2004, the disclosure of which is expressly incorporated by reference herein.

BACKGROUND AND SUMMARY OF THE INVENTION

This invention relates to a protective gas supply device for on-site supply of workplaces, comprising a liquid argon reservoir, a liquid oxygen reservoir or a liquid carbon dioxide reservoir and a helium supply as well as a first and second mixer, where the liquid argon reservoir and the liquid oxygen/carbon dioxide reservoir are connected by lines to the feed side of the first mixer and the discharge side of the first mixer is connected to at least one workplace. Furthermore, this invention relates to a method for on-site production of various protective gas mixtures containing a gas or a gas mixture comprising the components argon, carbon dioxide or oxygen and helium for electric arc joining, in particular for electric arc welding, where the argon, the carbon dioxide and the oxygen are supplied by evaporating from the liquid phase and whereby the evaporated argon and the evaporated oxygen/carbon dioxide are combined.

Electric arc joining includes electric arc welding, which has been available for a long time, and electric arc soldering under a protective gas, which has recently grown in importance. In addition, electric arc joining also includes the joining of different types of materials in which one material is fused while the other is only heated.

In electric arc welding under a protective gas, inert gases constitute the predominant portion of the protective gas. Argon is the inert gas most commonly used in gas-shielded welding. Gas mixtures of argon and oxygen or carbon dioxide are used mainly in processing structural steel, pipe steel, fine-grain structural steel, tempered steel, case-hardened steel, stainless steel, special high-grade steel, nickel-based materials and heat-resistant rolled and forged steel. By adding helium to the protective gas mixture, the heat balance of the protective gas in the electric arc and in the melt is improved so that a deeper fusion zone, better degassing and better wetting are achieved, depending on the material. Higher welding speeds are therefore achieved with helium. Protective gas mixtures containing helium are therefore preferred for use at welding stations equipped with robots.

It should be pointed out that very good welding results are achieved only when using a protective gas mixture optimized for the prevailing welding task. The composition of the protective gas mixture is coordinated precisely with the material, the properties of the welded material, the electric arc stability and the welding speed. Therefore, there are a number of different protective gas mixtures.

To be able to use the optimum protective gas mixture, it must be available to the welding device in a sufficient quantity. Normally a protective gas mixture is already completely mixed with multiple components by the gas supplier and is supplied in gas cylinders to the gas consumer. The gas consumer may then use the finished gas mixture without any additional operations. The large quantities of gas that must be supplied to the gas consumer are a disadvantage here. This is complicated to perform in particular in the case of a high-gas consumption. Since the volume of a gas is reduced several-fold by liquefaction, large quantities of gas are normally supplied and stored in liquid form. The required quantity of gas is removed in the form of vaporized liquid. Very large quantities of argon are needed for industrial fabrication, in particular in welding. Therefore, large-scale consumers usually have a liquid argon supply. Large-scale consumers frequently also have a supply of liquid oxygen and liquid carbon dioxide. Finished gas mixtures are complicated to handle for the large-scale consumer, which is why large-scale consumers prefer a liquid gas supply over cylinder supply or bundled supply.

However, the problem of supplying large quantities of protective gas mixtures tailored to the prevailing welding or soldering requirements has not yet been solved satisfactorily from a technical standpoint or in its practical implementation. There is no method for supplying differently designed workplaces in a factory building, where each station usually also operates with different joining tasks, with the particular optimized protective gas mixture in each case, while at the same time using available liquid gas supplies.

Therefore, the object of this invention is to provide a method which will permit liquid gas supplies to be included, so that workplaces using different types of equipment or performing different welding jobs can be supplied with the particular suitable protective gas mixtures. In particular the supply is to be adapted to manually operated workplaces and those operated by robots. Another object of this invention is to provide a method of on-site supply of workplaces in such a way as to solve the problem defined above.

This object is achieved according to this invention for the device by connecting the feed side of a second mixer to the discharge side of the first mixer and to the helium supply and connecting the discharge side of the second mixer to at least one additional workplace via lines. According to this invention, the first mixer prepares an argon-oxygen/carbon dioxide mixture with the liquid gas supplies being tied into the system. Lines carry this mixture to at least one workplace and to a second mixer. The second mixer adds the helium and conveys the three-component mixture to at least one additional workplace. With the inventive protective gas supply device, it is possible to supply the workplaces with different gas mixtures tailored to the joining task while tying in the liquid gas supplies. The two-component mixtures which are very widely used and a large portion of the three-component mixtures come from the liquid gas supply according to this invention. A liquid gas supply is characterized in that large quantities of gas require very little space for storage. Furthermore, supply by way of liquid gas reservoirs is very simple in terms of organization. When the liquid level in the tank has dropped below a certain mark, a tank truck must be ordered, which then refills the tank again. This does not necessitate an interruption in production. These advantages may be used according to this invention for two-component and three-component mixtures. The high investment cost of a liquid gas supply is a disadvantage. According to this invention, gas must be removed from the liquid gas supply not only for the two-component mixture but also for the three-component mixture, so the consumption of liquid gas is increased. This makes the existing liquid gas supply less expensive and/or makes the acquisition of a liquid gas supply economical. Helium in cylinders or cylinder bundles is to be supplied additionally only for a few workplaces. In the case of helium, supply in cylinders or bundles are the simplest type in terms of organization. However, the number of helium cylinder bundles is low in comparison with the number of bundles that would be necessary if the three-component mixture were to be supplied as a ready-to-use gas mixture. Two cylinder bundles are especially advantageous as the helium supply. The second bundle makes it possible to continue the gas supply to the workplaces even when the empty first bundle is being replaced, thus eliminating pauses in operation due to replacement of a bundle.

In an advantageous embodiment of this invention, the workplaces connected to the discharge side of the first mixer are equipped with manual welders and the workplaces connected to the discharge side of the second mixer are equipped with robot welders. The advantages of this invention are especially manifested in this embodiment because mixtures containing helium are preferred for use at robot workplaces, whereas mixtures without any helium content are preferred at manually operated workplaces.

In an advantageous refinement, at least one additional workplace is connected by lines directly to the liquid argon tank. It is thus also possible to supply workplaces with pure argon. Thus the advantages with regard to flexibility are particularly pronounced.

Advantageously all the workplaces connected to the protective gas supply device are located in a single factory building.

The liquid gas tanks are advantageously situated outside the factory building and the helium supply is situated inside the building.

In an advantageous embodiment, the lines carrying the argon-oxygen/carbon dioxide mixture are designed as ring lines connected to the first mixer. The ring line supplies the workplaces with the argon-oxygen/carbon dioxide mixture. Instead of the ring line, a line leading not directly to a workplace but instead to a second mixer is used. The second mixer then specifically supplies the workplaces needing an argon-oxygen/carbon dioxide-helium mixture. With this invention embodiment, the advantages of a ring line may also be utilized. A ring line is characterized by a uniform gas supply without gas losses.

This object is achieved with regard to this method by adding helium to the argon-oxygen/carbon dioxide mixture, in which case the argon-oxygen/carbon dioxide mixture is made available to at least one workplace and the argon-oxygen/carbon dioxide-helium mixture is made available to at least one additional workplace. All of the advantages mentioned are achieved with the inventive method.

The argon-oxygen/carbon dioxide mixture is advantageously used for manual welding while the argon-oxygen/carbon dioxide-helium mixture is used for robot welding.

Other objects, advantages and novel features of the present invention will become apparent from the following detailed description of the invention when considered in conjunction with the accompanying drawings.

BRIEF DESCRIPTION OF THE DRAWINGS

The FIGURE shows an exemplary embodiment of the inventive protective gas supply device in a factory building having multiple workplaces.

DETAILED DESCRIPTION

The FIGURE shows symbolically a liquid argon reservoir 1, a liquid oxygen tank 2, a helium supply 3, two mixers 4, 5, leads to eight workplaces 6 through 13 and a factory building 14. The gaseous argon taken from the liquid argon reservoir 1 is mixed with the gaseous oxygen taken from the liquid oxygen tank 2 in a two-component mixer 4 and sent to the workplaces 6 through 11. The argon-oxygen mixture is also sent to the feed side of the mixer 5. The helium supply 3 is also connected to the input side of the mixer 5. Then the argon-oxygen-helium mixture required at workplaces 12 and 13 is formed in the mixer 5. The argon-oxygen-helium mixture is sent from the discharge side of the mixer 5 to the workplaces 12 and 13. All the workplaces 6 through 13 are located in the factory building 14. The factory building 14 is thus equipped with a ring line. The argon-oxygen mixture is fed into this ring line. An argon-oxygen-helium mixture is required at the workplaces 12 and 13 where welding is performed by robots. Therefore, the helium supply 3 is supplied at workplaces 12 and 13 in the form of helium bundles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Protective gas supply device for on-site supply of workplaces, comprising:
   a liquid argon reservoir;
   a liquid oxygen reservoir or a liquid carbon dioxide reservoir;
   a helium supply;
   a first mixer and a second mixer,
   wherein
      the liquid argon reservoir and the liquid oxygen or liquid carbon dioxide reservoir are connected by lines to a feed side of the first mixer,
      a discharge side of the first mixer is connected to at least one workplace and to a feed side of the second mixer,
      the helium supply is connected to the feed side of the second mixer, and
      a discharge side of the second mixer is connected to at least one additional workplace.

2. Protective gas supply device as claimed in claim 1, wherein the workplaces that are connected to the discharge side of the first mixer are equipped with manual welding equipment and the workplaces connected to the discharge side of the second mixer are connected to robot-welding equipment.

3. Protective gas supply device as claimed in claim 1, wherein at least workplace is connected by lines directly to the liquid argon tank.

4. Protective gas supply device as claimed claim 1, wherein all the workplaces connected to the protective gas supply device are located in a single factory building.

5. Protective gas supply device as claimed in claim 4, wherein the liquid gas tanks are located outside the factory building and the helium supply is located inside the factory building.

6. Protective gas supply device as claimed in claim 1, wherein the lines carrying the argon-oxygen or argon-carbon dioxide mixture are designed as a ring line connected to the first mixer.

7. Method of on-site production of various protective gas mixtures containing a gas mixture of one or more members selected from the group consisting of argon, carbon dioxide or oxygen and helium for electric arc joining or welding, comprising the steps of:
   supplying argon and one of oxygen or carbon dioxide evaporated from on-site liquid reservoirs to a feed side of an on-site first mixer;
   mixing the supplied gases in the first mixer; and
   supplying the mixed gas to at least one work place and to a feed side of an on-site second mixer;
   supplying helium to the feed side of the second mixer; and
   mixing the mixed gas with helium in the second mixer; and
   supplying the mixed gas and helium mixture to at least one additional workplace.

8. Method as claimed in claim 7, wherein the mixed gas is used for manual welding and the mixed gas and helium mixture is used for robot welding.

* * * * *